April 1, 1930.  A. J. SOBECKI  1,752,706
FISH LURE
Filed Aug. 16, 1928
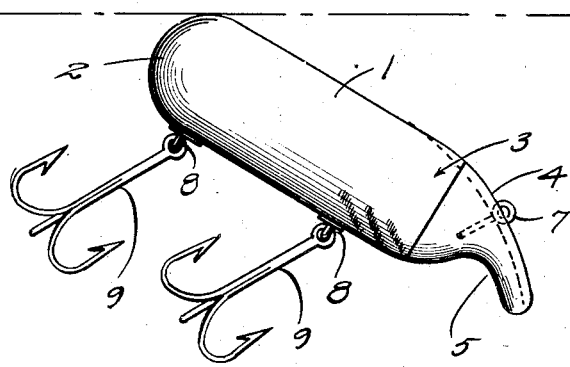
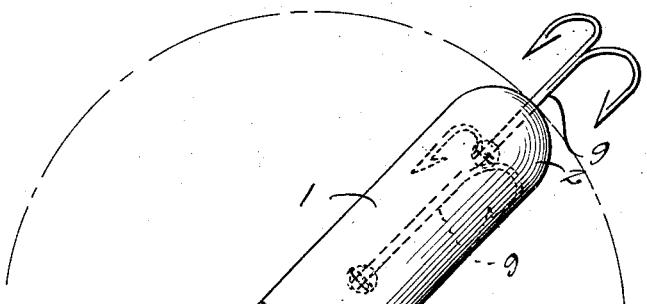
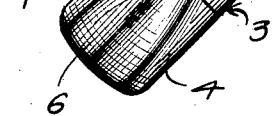
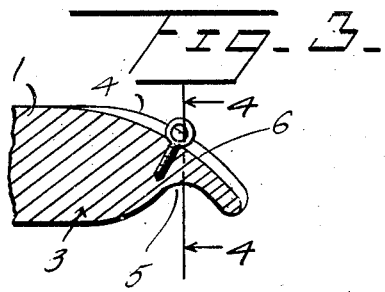
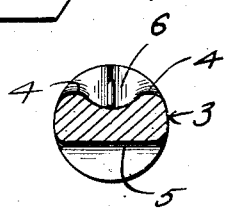
Inventor
Anthony J. Sobecki
By Watson E. Coleman
Attorney

Patented Apr. 1, 1930

1,752,706

UNITED STATES PATENT OFFICE

ANTHONY J. SOBECKI, OF SOUTH BEND, INDIANA

FISH LURE

Application filed August 16, 1928. Serial No. 300,067.

This invention relates to fishing tackle and pertains particularly to an improved type of fish lure. The primary object of this invention is to provide a new and novel type of lure designed to perform certain movements calculated to attract fish and cause the same to take the bait.

The invention broadly contemplates the provision of a plug of elongated circular design and of substantially the same diameter throughout its length, one end thereof being formed to provide a downturned head so formed that when the lure is drawn through the water by a line attached to the head thereof the head will be drawn down into the water and the rear end of the body will swing back and forth in much the same manner as a fish's tail is moved. Suitable hook members are secured to the underside of the body one adjacent each end, one being so positioned adjacent the rear as to trail behind the body.

The invention will be best understood from a consideration of the following detailed description taken in connection with the accompanying drawing forming a part of the present invention, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in side elevation of the lure embodying the present invention;

Figure 2 is a top plan view of the same;

Figure 3 is a central longitudinal section through the forward portion of the lure body;

Figure 4 is a transverse section taken upon the line 4—4 of Figure 3.

Referring more particularly to the drawing the numeral 1 indicates generally the body of the lure embodying this invention, the same being, as shown, relatively long and of circular formation. The body is also of substantially the same diameter throughout its length, the rear end 2 being finished off by being rounded as shown.

The head 3 of the lure is in the form of a broad flat tongue the upper surface 4 being curved downwardly and forwardly while the under surface is concaved to form the throat 5. This flat head is substantially the same width as the body 1 and though curved at an oblique angle to the length of the body, it does not extend beyond the line of the side wall thereof.

The upper surface of the head 3 is provided with the longitudinally extending groove or valley 6 which gradually decreases in width and in depth from the forward end to the rear thereof. In the longitudinal center of the valley 6 and at substantially the transverse center also is fixed an attaching eye 7 for the connection of the fish line to the lure.

Upon the underside of the body there is secured to the eyes 8 which are positioned upon the longitudinal center thereof, the hooks 9. These hook attaching eyes are located preferably one adjacent the rear end of the body and the other adjacent the rear of the head.

When the present plug is drawn through the water, it assumes a position therein as shown in the side elevational view in Figure 1 and if viewed from above while being drawn through the water it will be seen to have a movement like that indicated in Figure 2, that is all of the body rearwardly of the head will swing from one side to the other about an axis located substantially at the rear of the head. This movement simulates closely the tail movement of a fish. The rear one of the hooks 9 will trail after the plug body while the forward one will assume a substantially horizontal position beneath the center of the body.

From the foregoing description it will be readily understood that a new and novel type of lure has been perfected which it is believed will be more effective in accomplishing the purposes for which it is designed than other lures of this type.

Having described my invention what I claim is:—

1. A fish lure, comprising an elongated buoyant body of cylindrical cross section and substantially the same diameter throughout, said body having a head at one end in the form of a broad curved tongue having a convex surface provided with a longitudinally extending valley, the entire tongue lying in the area defined by a cross section of the body, hook members carried by the body, and means for attaching a line to the convex side of the head.

2. A fish lure, comprising an elongated buoyant body of cylindrical cross section and substantially the same diameter throughout, said body having a head at one end in the form of a broad curved tongue having a convex surface provided with a longitudinally extending valley, hook members carried by the body, means for attaching a line to the convex side of the head, and said head being relatively short and of a width substantially equal to the diameter of the body.

3. A fish lure, comprising an elongated buoyant body of cylindrical cross section and of substantially the same diameter throughout, said body having one end formed to provide a head in the form of a relatively short curved tongue, said tongue being substantially equal in width to the diameter of the body and having a concaved under surface extending transversely of the body and a longitudinally extending valley in the convex surface thereof of gradually decreasing width and depth from the front to the rear end, means for attaching a line to the head in substantially the central part of the valley, and hook members secured to the under side of the body rearwardly of the head thereof.

In testimony whereof I hereunto affix my signature.

TONY J. SOBECKI.